United States Patent [19]

Kocher

[11] Patent Number: 4,516,994

[45] Date of Patent: May 14, 1985

[54] APPARATUS FOR SEPARATING LIQUID DROPLETS FROM GAS

[75] Inventor: Erich J. Kocher, Milwaukee, Wis.

[73] Assignee: Vilter Manufacturing Corporation, Milwaukee, Wis.

[21] Appl. No.: 598,992

[22] Filed: Apr. 11, 1984

[51] Int. Cl.³ .............................................. B01D 45/12
[52] U.S. Cl. ....................................... 55/337; 55/498; 210/304
[58] Field of Search ................. 55/337, 332, 456, 447, 55/482, 498; 210/304

[56] References Cited

U.S. PATENT DOCUMENTS

| | | | |
|---|---|---|---|
| 767,721 | 8/1904 | Swartwout | 55/456 |
| 1,836,004 | 12/1931 | Becker | 55/456 |
| 3,078,650 | 2/1963 | Anderson et al. | 55/456 |
| 3,386,230 | 6/1968 | Riesberg et al. | 55/337 |
| 4,157,968 | 6/1979 | Kronsbein | 55/482 |
| 4,364,754 | 12/1982 | Diachuk | 55/456 |

FOREIGN PATENT DOCUMENTS

| | | | |
|---|---|---|---|
| 456174 | 2/1926 | Fed. Rep. of Germany | 55/482 |
| 36776 | 5/1978 | Japan | 55/337 |

Primary Examiner—Bernard Nozick

Attorney, Agent, or Firm—James E. Nilles; Thomas F. Kirby

[57] ABSTRACT

An oil separator assembly for separating and recovering oil droplets from compressed hot refrigerant gas circulating in a refrigeration system comprises a hollow metal tank having a chamber in which a hollow cylindrical fine-mesh filter element is vertically mounted. The filter element has a hollow cylindrical bore open at its upper end and closed at its lower end. A gas/liquid inlet pipe extends into the top of the tank and communicates directly with and extends into the upper end of the filter element bore. The inlet pipe has a passage therethrough defined by a wall. A gas outlet pipe extends into the top of the tank and communicates directly with the chamber to expel gas separated from the oil by the filter element. An oil outlet port extends into the bottom of the tank to allow for drainage of oil separated from the gas by the filter element. A deflector in the form of a flat metal strip twisted into a spiral shape is mounted in the inlet pipe passage in contact with the wall thereof to cause the incoming gas/oil mixture to impinge forcefully against the bore wall whereby oil droplets coalesce into larger drops and to expedite movement of the gas and larger drops through the filter element.

9 Claims, 4 Drawing Figures

APPARATUS FOR SEPARATING LIQUID DROPLETS FROM GAS

BACKGROUND OF THE INVENTION

1. Field of Use

This invention relates generally to apparatus for separating liquid droplets from gas in which they are suspended.

In particular, it relates to apparatus, such as an oil separator or oil filter assembly, used for separating and recovering oil droplets suspended in pressurized hot refrigerant gas circulating in a refrigeration system.

2. Description of the Prior Art

In a typical large commercial refrigeration system, a suitable refrigerant gas such as freon or ammonia is compressed (and heated) in a reciprocating or rotary compressor and is then supplied to a condensor, to an evaporator and back to the compressor for recompression and recirculation. The compressor employs oil therein for sealing, cooling and lubrication purposes. Some of this oil forms a fog (or vaporizes if it becomes hot enough) and mixes with the refrigerant being circulated. This is undesirable for several reasons. Lost oil (on the order of one gallon per day, for example) needs to be replaced to ensure proper compressor operation. Furthermore, condensation and collection of oil in other parts of the system, such as in the evaporator, causes loss of system efficiency and needs to be removed periodically. Filling and/or draining the system are costly and time consuming procedures and result in system down-time.

Therefore, it is customary to employ oil separator apparatus in the system, usually between the compressor and the condenser, to separate the oil and return it to the compressor by means of a pump and to allow the substantially oil-free refrigerant gas to continue on to the condenser. It should be noted that reciprocating and rotary compressors typically operate at gas temperatures of about 300° F. and 175° F., respectively, and therefore oil vaporization and condensation are more likely to occur in reciprocating compressors.

The following U.S. and foreign patents illustrate prior art separators for separating liquids from gas; U.S. Pat. Nos. 4,111,815; 4,053,290; 3,802,160; 3,791,105; 3,300,951; 1,912,235; 1,463,990; 780,682; British Pat. No. 921,753; Italian Pat. No. 273,917.

Some of the problems inherent in prior art separators are: unduly complex designs making manufacturing and servicing difficult, numerous joints which need to be sealed but still offer possibilities for gas and oil leakage, inefficient filter elements and arrangements requiring relatively frequent filter element replacement or system draining.

SUMMARY OF PRESENT INVENTION

Apparatus is provided in accordance with the invention for separating liquid droplets from gas in which they are suspended. The apparatus preferably takes the form of an oil separator assembly for separating and recovering oil droplets suspended in pressurized hot refrigerant gas circulating in a refrigeration system. The apparatus comprises a sealed metal housing or tank having a chamber therein and a filter element mounted in the chamber. The filter element has a bore therein open at one end and closed at its other end. The filter element has a porous exterior surface and a porous interior surface confronting the bore. An inlet conduit extends into the housing and directly into the open end of the filter element bore for directing a mixture of liquid droplets and gas into the bore. The lower end of the inlet conduit terminates some distance above the closed end of the bore in the filter element. Deflector means are mounted in the inlet conduit for directing the mixture therethrough and into the filter element bore and transversly against the interior surface of the inlet conduit. Gas exits from the open bottom end of the inlet conduit, enters the bore and the filter element and then passes through the porous interior surface and out of the porous exterior surface of the filter element. Simultaneously, the fine liquid droplets are caused to impinge forcefully on the interior surface of the inlet conduit and coalesce into larger drops of liquid which drain down and out from the open bottom end of the inlet conduit. The drops enter the lower end of the bore of the filter element and then the drops pass through the porous interior surface confronting the filter element bore and through the filter element. A gas outlet conduit extends into the housing and communicates with the chamber for conducting filtered gas from the chamber. A liquid outlet conduit extends into the housing for conducting from the chamber the filtered liquid drained from the exterior of the filter which collects at the bottom of the chamber.

The deflector means preferably comprises a deflector member defining one or more spiral passage, each passage being open on a side thereof confronting the interior surface of the inlet conduit. A spiral passage increases the surface area against which oil droplets can impinge and form larger drops. The deflector member preferably takes the form of a strip of material which is spirally twisted and has edges which make contact with the interior surface of the inlet conduit. The filter element comprises one outer cylindrical section defining pores on the order of 0.3 micron in size and, preferably, further comprises another inner cylindrical section arranged concentrically within the outer section and defining pores of a size larger than the pores in said one section. In operation, most of the liquid passes through the lower ends of the two cylindrical sections of the filter and most of the gas passes through the upper ends of the filter sections. As a result, the filter element tends not to become blocked, even over a long period of usage.

The housing comprises a hollow cylindrical metal body having a wall and upper and lower end caps connected to opposite ends of said hollow body and cooperable therewith to define the chamber. Preferably, the upper and lower end caps are connected to the body by welding, but, for convenience of removal, the lower end cap may be connected by bolts connected to a flange. The mixture inlet conduit and the gas outlet conduit extend through openings in the wall of the body and are welded to the wall. The liquid outlet conduit extends through an opening in the lower end caps and is welded thereto.

Means are provided for supporting the filter element in the chamber and comprises a flange on the inlet conduit and a support assembly mounted on the lower end cap between which said filter element is entrapped. The support assembly is adjustable so as to ensure tight entrapment of the filter and comprises bracket means connected to the lower end cap, a filter holder plate connected to the lower end of the filter element, and a set screw rotatably mounted on the bracket means and bearing against the filter holder plate. The deflector means causes the incoming gas/oil mixture to impinge forcefully against the inner wall surface of the inlet conduit and expedites coalescing of the liquid drops as the droplets move through the inlet conduit.

The oil separator assembly is adapted for vertical suspension mounting in a horizontal pipeline.

The aforementioned gas/oil inlet pipe supplies a mixture of compressed hot (about 300° F.) refrigerant gas and small droplets of oil (up to one gallon per day) from a compressor (not shown) to the interior of the filter element and down along the deflector member by means of which it is flung outwardly against the inlet conduit wall by centrifugal force. The oil is then filtered out of the mixture and drains down the outside of filter element by gravity to the oil outlet in the lower end cap and from thence through a float valve (not shown) for recirculation to the suction side of the compressor (not shown).

An oil separator assembly in accordance with the invention offers numerous important advantages over the prior art. For example, the assembly employs an improved filter element which has a first inner stage for filtering out larger oil droplets (and contaminants) and a second outer stage of even finer mesh than the first stage for filtering out smaller oil droplets. Most of the oil passes through the lower end of the filter element and thus the tendency of the filter to clog uniformly is reduced. The assembly is disposed vertically and filters out nearly 99.9 percent of the small amount of oil entering through the gas/oil inlet pipe—substantially more than prior art separators. The assembly is virtually leak-proof and, since filter change is needed only about once every 5 years, the lower end cap may be welded in place cut off and re-welded during a filter element change. However, as an alternative, the lower end cap may be bolted in place instead of welded. All joints and seams in the separator housing (except for the lower end cap, if desired) are welded to prevent oil or gas leakage under high pressure conditions. Other objects and advantages of the invention will hereinafter appear.

DRAWINGS

DESCRIPTION OF A PREFERRED EMBODIMENT

Figures 1, 2, 3, 4:
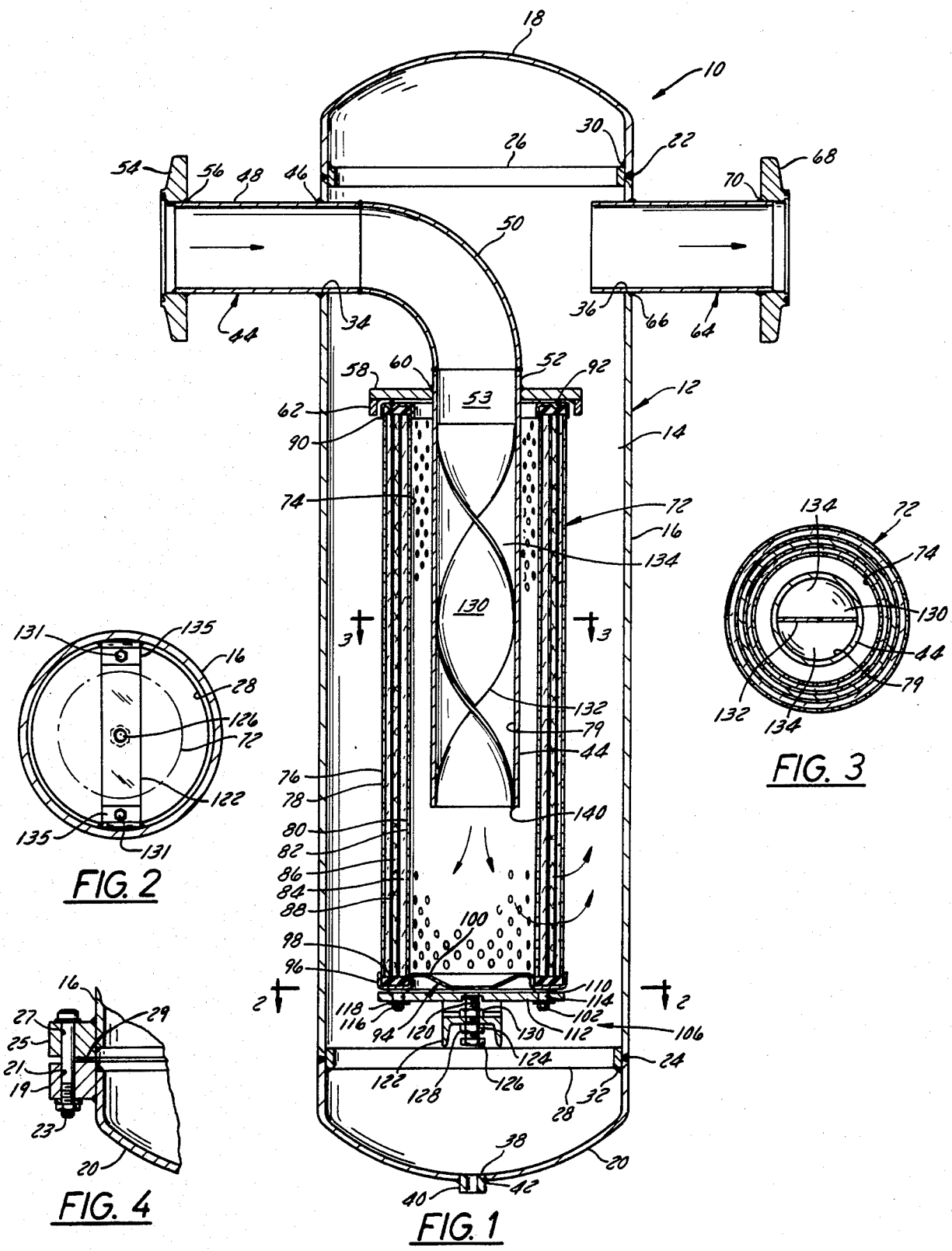
FIG. 1 is a vertical cross-section view of apparatus such as an oil separator in accordance with the invention for separating liquid droplets from gas.
FIG. 2 is a top plan view of portions of a filter support assembly taken on line 2—2 of FIG. 1.
FIG. 3 is a cross-section view of a filter element and associated deflector element taken on line 3—3 of FIG. 1.
FIG. 4 is a view of a portion of the lower end of an oil separator such as shown in FIG. 1 and shows alternate means for attaching the lower end cap to the body.

FIG. 1 shows apparatus such as an oil filter assembly or oil separator 10 in accordance with the present invention. Oil separator 10 is well-suited for use in a refrigeration system, preferably being located between a compressor (not shown) and a condenser (not shown), to separate and recover fine oil droplets suspended in compressed hot refrigerant gas being supplied from the compressor for circulation in the system. However, oil separator 10 could be used in other types of systems wherein liquid droplets need to be removed from circulating gas.

Oil separator assembly 10 generally comprises a hollow metal housing or tank 12 having a chamber 14 in which a hollow cylindrical fine-mesh filter element 72 is vertically mounted. The filter element 72 has a hollow cylindrical bore 74 open at its upper end and closed at its lower end. A gas/liquid inlet pipe 44 extends into the top of the tank 12 and communicates directly with the filter element bore 74 by extending thereinto. A gas outlet pipe 64 extends into the top of the tank 12 and communicates directly with the chamber 14 to expel gas separated from the oil by the filter element 72. An oil outlet pipe 40 extends into the bottom of the tank 12 to allow for drainage from chamber 14 of oil separated from the gas by the filter element 72. A deflector means 130 in the form of a flat metal strip 132 twisted into a spiral shape is mounted in the innermost end of the inlet pipe 44 and is in contact with the inner wall 79 thereto to cause the incoming gas/oil mixture to impinge forcefully against the wall 79, whereby oil droplets coalesce and to expedite movement of the mixture into bore 74 and through the filter element 72.

More specifically, tank 12 comprises a hollow open-ended vertically disposed cylindrical metal body 16 which is closed at its upper and lower ends by hemispherically-shaped upper and lower metal end caps 18 and 20, respectively, which in FIG. 1 are welded as at 22 and 24, respectively, to the body. In FIG. 4, which shows an alternate embodiment, lower end cap 20 is provided with a flange 19 having holes such as 21 for receiving a bolt 23 by which it is secured to a flange 25 on body 16 which has a bolthole 27. A gasket 29 is located between the flanges 19 and 25. The caps 18 and 20 are provided on the inside thereof with annularly-shaped metal alignment rings 26 and 28 which are welded to the caps as at 30 and 32 and serves to aid in placement of the caps on the body during manufacture of separator 10. Body 16 of tank 12 is provided with conduit-receiving holes 34 and 36 near its upper end. Lower cap 20 is provided with a conduit-receiving hole 38 in the bottom thereof in which a hollow oil outlet pipe or conduit 40 is welded at 42.

The gas/liquid inlet conduit or pipe 44 of generally L-shaped configuration is mounted in hole 34 in body 16 as by welding at 46. Pipe 44 could be fabricated in one piece or fabricated, as shown, of several welded-together pieces such as a horizontal straight section 48, a 90° elbow section 50 and a vertical straight section 52 which extends about ⅔ of the way into bore 74 and is spaced from the wall of bore 74. Pipe 44 is provided on its outer end with a flange 54 welded in place as at 56 which adapts oil separator 10 for vertical mounting to a horizontal pipe (not shown) forming part of a refrigeration system (not shown). Pipe 44 is provided on its inner end with an upper filter holder plate or flange 58 having an outer lip 62 and welded in place as at 60 to serve as part of a filter element support means hereinafter described. Pipe 44 communicates with bore 74 of filter element 72, as hereinafter described.

The gas outlet conduit or pipe 64 of straight configuration is mounted in hole 36 in body 16 as by welding at 66. Pipe 64 is provided on its outer end with a flange 68 welded in place as at 70 which also adapts oil separator 10 for vertical mounting to a horizontal pipe (not shown) forming part of the refrigeration system (not shown). Pipe 64 communicates directly with chamber 14 in tank 12.

The filter element 72, which is mounted in chamber 14 in vertical disposition as hereinafter described, takes the form of a hollow cylindrical element having a hollow cylindrical bore 74 therein, which bore is open at its upper end and closed at its lower end. More specifically, filter element 72 comprises a hollow cylindrical metal outer shell 76 having perforations 78 therethrough and a hollow cylindrical metal inner shell 80 having perforations 82 therethrough arranged concentrically within and spaced from outer shell 76. A first or inner hollow cylindrical filter member 84 is disposed between the inner shell 80 and outer shell 76. A second or outer hollow cylindrical filter member 86 is disposed between filter member 84 and outer shell 76. A perforated hollow cylindrical separator or spacer element 88 is disposed between the two filter members 84 and 86. The cylinders 76, 80, 84, 86 and 88 are held together in rigid relationship at their upper end by an upper annularly-shaped end closure ring 90 of C-shaped cross-sectional configuration which contains an annular sealing gasket 92. The cylinders are held together in rigid relationships at their lower end by a lower closure plate 94 which includes an annularly-shaped portion 96 of C-shaped cross-section configurations which contains an annular sealing gasket 98. Plate 94 comprises a center portion 100 which seals the lower end of the filter element bore 74. Outer filter member 86 has pore sizes on the order of 3/10 micron in diameter, whereas the inner filter member 84 has pore sizes of slightly larger diameter. The filter element 72 may, for example, take the form of a Model Number RS0496-1 filter element available from Technolab, 8506 Lake Avenue, Cleveland, Ohio 44102.

As previously stated, the filter element 72 is entrapped between filter holder plate 58 on pipe 44 and a support assembly 106 which comprises a lower support plate 112. More specifically, the filter element support means or support assembly 106 comprises a plurality of internally threaded members 102 which are secured as by welding at 110 to the outside of lower closure plate 94. Support assembly 106 further comprises the lower support plate 112 having holes 114 therethrough for accommodating the threaded members 102. Plate 112 is secured to the lower end of filter element 72 by screws 116 (and washers 118) which screw into the members 102. Plate 112 comprises an adjustment screw recess 120 on its underside. Support assembly 106 also comprises a channel member or bracket 122 which is mounted by bolts 131 to two angle clips 135 which are welded to the inside of housing 16. Channel member 122 comprises a hole 124 for receiving a threaded adjustment screw 126 which extends therethrough and into recess 120 in plate 112. A positioning nut 128 and a lock nut 130 hold screw 126 in a predetermined position.

During assembly, before the lower end cap 20 is attached to body 16 of oil separator assembly 10, the filter element 72 with support plate 112 secured to the bottom thereof is slid onto pipe 44 from the lower end of the pipe. Then, the channel member 122 (with the adjustment screw 126 and nuts 128 and 130 thereon) is emplaced so that its ends are bolted to clips 135. Then, adjustment screw 126 is adjusted against lower support plate 112 so that filter element is snuggly entrapped and the nuts 128 and 130 are tightened. Thereafter, lower end cap 20 with attached alignment ring 28 is welded in place (FIG. 1) or, alternatively, secured in place by bolts such as 23 (FIG. 4).

As previously explained, filter element 72 has a bore 74 therein open at its upper end and closed at its lower end. Filter element 72 has a porous exterior surface and a porous interior surface confronting bore 74.

Inlet conduit 44 extends into housing 12 and communicates with the open end of bore 74 for directing a mixture of liquid droplets and gas into the bore. More specifically, vertical section 52 of inlet pipe 44, which is of smaller outside diameter than bore 74, extends about ⅔ of the way into bore 74. Section 52 has a passage 53 therethrough defined by a wall 79. The gas/oil droplet mixture enters the upper end of section 52 and passes downwardly therethrough. Gas exits from the open bottom end of the inlet conduit 44, enters the bore 74 of the filter element 72 and then passes through the porous interior surface and out of the porous exterior surface of the filter element 72. Simultaneously, the fine liquid droplets are caused to impinge forcefully on the interior surface wall 79 of the inlet conduit 44 and coalesce into larger drops of liquid which drain down and out from open bottom end of the inlet conduit 44. The drops enter the lower end of the bore 74 of the filter element 72 and the drops pass through the porous interior surface and out the exterior surface of filter element 72. In operation, most of the liquid passes through the lower ends of the two cylindrical sections 84 and 86 of the filter element 72 and most of the gas passes through the upper ends of the filter sections 84 and 86. As a result, the filter element 72 tends not to become blocked, even over a long period of usage. A deflector means 130 is mounted in section 52 of pipe 44 for directing the mixture axially therethrough and also in a direction transverse to and radially outwardly of the axis of the pipe section 52 against the interior surface 79 of the pipe section, and finally into the bore 74 and then through the filter element 72. The mixture inpinges forcefully against the interior surface 79 of bore 74 of filter element 72 and is finally forced through the filter element so that filtered gas collects in chamber 14 and liquid oil filtered therefrom collects by gravity at the bottom of chamber 14 in end cap 20. The deflector means 130 comprises a member 132 defining at least one spiral passage, such as 134, said passage being open on a side thereof confronting the interior surface of the pipe 44. Preferably, the member 132 takes the form of a flat rigid strip of metal which is spirally twisted to define two spiral passages such as 134 and is welded at its ends as at 140 to pipe section 52.

I claim:

1. Apparatus for separating liquid droplets from gas in which they are suspended comprising:
   a hollow housing having a chamber therein;
   a filter element mounted in said chamber and spaced from the walls thereof and above the floor thereof, said filter element having a bore therein open at its upper end and closed at its lower end,
   said filter element having a porous exterior surface and a porous interior surface confronting said bore;
   an inlet conduit extending into said housing and into the open end of said bore for directing a mixture of liquid droplets and gas into said bore, said inlet conduit having a passage therethrough defined by a wall, said inlet conduit being spaced from said interior surface of said bore and from said closed lower end of said filter element;
   means for sealing the space at the open end of said bore between the outside of said inlet conduit and said filter element;
   deflector means mounted in said inlet conduit for directing said mixture therethrough and transversely against said wall of said passage and from thence into said bore and through said filter element;

a gas outlet conduit extending into said housing and communicating with said chamber for conducting filtered gas from said chamber;

and a liquid outlet conduit extending into said housing near the bottom of said chamber for conducting filtered liquid drained from the exterior of said filter from said chamber.

2. Apparatus according to claim 1 wherein said deflector means comprises a member defining at least one spiral passage, said passage being open on a side thereof confronting said porous interior surface of said filter element.

3. Apparatus according to claim 2 wherein said member defines a plurality of said spiral passages.

4. Apparatus according to claim 3 wherein said member takes the form of a strip of material which is spirally twisted.

5. Apparatus according to claim 4 wherein said strip of material has edges which make contact with the interior surface of said passage in said inlet conduit.

6. Apparatus according to claim 1 or 2 or 3 or 4 or 5 wherein said filter element comprises one section defining pores on the order of 0.3 micron in size.

7. Apparatus according to claim 6 wherein said filter element further comprises another section arranged concentrically within said one section, said other section defining pores of a size larger than the pores in said one section.

8. An oil separator assembly for separating and recovering oil droplets from compressed hot refrigerant gas circulating in a refrigeration system comprising:

a hollow metal tank having a chamber therein;

a hollow cylindrical fine-mesh filter element vertically mounted in said chamber and spaced from said metal tank, said filter element having a hollow cylindrical bore defined by a porous wall and open at its upper end and closed at its lower end;

a gas-liquid inlet pipe extending into the top of said tank and communicating directly with and extending into said upper end of said bore, said inlet pipe having a passage therethrough defined by a passage wall, said inlet pipe being spaced from said porous wall of said bore and from said closed lower end of said filter element;

means for sealing the space at the open end of said bore between the outside of said inlet conduit and said filter element;

a gas outlet pipe extending into the top of said tank and communicating directly with said chamber to expel gas separated from the oil by said filter element;

an oil outlet port extending into the bottom of said tank to allow for drainage of oil separated from the gas by said filter element;

and means in the form of a strip of material twisted into a spiral shape mounted in said passage and in contact with said passage wall to cause the incoming gas/oil mixture to impinge forcefully against said passage wall whereby oil droplets coalesce into larger drops and to expedite movement of the gas and said larger drops through said filter element.

9. Apparatus for separating liquid droplets from gas in which they are suspended comprising:

a housing comprising a hollow body having a wall and end caps connected to opposite ends of said hollow body and cooperable therewith to define a chamber, said body having openings therein affording access to said chamber;

a tubular filter element in said chamber and having a bore therein open at both ends, said filter element having a porous exterior surface and a porous interior surface confronting said bore therein;

an inlet conduit extending through an opening in said housing and into one open end of said bore for directing a mixture of liquid droplets and gas into said bore, said inlet conduit having a passage therethrough defined by a passage wall;

deflector means mounted in said passage of said inlet conduit for directing said mixture therethrough and transversely against said passage wall and from thence into said bore and through said filter element;

means for supporting said filter element in said chamber and comprising a flange on said inlet conduit and a support assembly mounted on said housing between which said filter element is entrapped, said support assembly comprising bracket means connected to said housing, an adjustably positionable filter holder plate adjacent an end of said filter element, and a set screw rotatably mounted on said bracket means and bearing against said filter holder plate to effect adjustment thereof;

a gas outlet conduit extending through an opening in said housing and communicating with said chamber exteriorly of said filter element for conducting filtered gas from said chamber;

and a liquid outlet conduit extending through an opening in said housing for conducting filtered liquid drained from the exterior of said filter from said chamber, each of said conduits being welded to said housing.

* * * * *